(12) United States Patent
Goodman et al.

(10) Patent No.: US 9,418,424 B2
(45) Date of Patent: Aug. 16, 2016

(54) LASER SCANNING SYSTEMS AND METHODS

(71) Applicant: MakerBot Industries, LLC, Brooklyn, NY (US)

(72) Inventors: Taylor S. Goodman, New York, NY (US); William B. Buel, Sunnyvale, CA (US); Vishnu Anantha, Brooklyn, NY (US); Robert J. Steiner, Brooklyn, NY (US)

(73) Assignee: MakerBot Industries, LLC, Brooklyn, NY (US)

(*) Notice: Subject to any disclaimer, the term of this patent is extended or adjusted under 35 U.S.C. 154(b) by 74 days.

(21) Appl. No.: 14/456,010

(22) Filed: Aug. 11, 2014

(65) Prior Publication Data

US 2015/0043225 A1 Feb. 12, 2015

Related U.S. Application Data

(60) Provisional application No. 61/864,158, filed on Aug. 9, 2013, provisional application No. 61/875,360, filed on Sep. 9, 2013, provisional application No. 61/906,171, filed on Nov. 19, 2013.

(51) Int. Cl.
| | |
|---|---|
| *G01C 15/02* | (2006.01) |
| *G06T 7/00* | (2006.01) |
| *G01C 15/00* | (2006.01) |
| *G01B 11/24* | (2006.01) |

(Continued)

(52) U.S. Cl.
CPC ............ *G06T 7/002* (2013.01); *F21V 14/02* (2013.01); *G01B 11/24* (2013.01); *G01B 11/2504* (2013.01); *G01B 11/2518* (2013.01); *G01C 15/002* (2013.01); *G01C 15/004* (2013.01); *G06T 15/60* (2013.01); *G06T 17/00* (2013.01); H04N 5/23216 (2013.01); *H04N 9/735* (2013.01); *H04N 13/0257* (2013.01); *G06T 2207/10012* (2013.01); *H04N 2209/042* (2013.01)

(58) Field of Classification Search
CPC ............................ G01C 15/004; G01C 15/002
USPC ........................................................... 33/286
See application file for complete search history.

(56) References Cited

U.S. PATENT DOCUMENTS

| | | | | |
|---|---|---|---|---|
| 4,773,164 | A * | 9/1988 | Taylor | F41G 1/54 33/286 |
| 4,825,258 | A * | 4/1989 | Whitson | F41G 1/54 33/286 |

(Continued)

FOREIGN PATENT DOCUMENTS

WO WO 2015026847 A1 * 2/2015 .......... B29C 67/0059

OTHER PUBLICATIONS

"Competitive Analysis", http://www.bryanvaccaro.org/thesis/blog/, Aug. 22, 2013, 2 pages.

*Primary Examiner* — Christopher Fulton
(74) *Attorney, Agent, or Firm* — Strategic Patents, P.C.

(57) ABSTRACT

A three-dimensional scanner uses a rotatable mounting structure to secure a laser line source in a manner that permits rotation of a projected laser line about an axis of the laser, along with movement of the laser through an arc in order to conveniently position and orient the resulting laser line. Where the laser scanner uses a turntable or the like, a progressive calibration scheme may be employed with a calibration fixture to calibrate a camera, a turntable, and a laser for coordinated use as a three-dimensional scanner. Finally, parameters for a scan may be automatically created to control, e.g., laser intensity and camera exposure based on characteristics of a scan subject such as surface characteristics or color gradient.

18 Claims, 8 Drawing Sheets

(51) Int. Cl.
*H04N 5/232* (2006.01)
*H04N 9/73* (2006.01)
*H04N 13/02* (2006.01)
*F21V 14/02* (2006.01)
*G06T 15/60* (2006.01)
*G06T 17/00* (2006.01)
*G01B 11/25* (2006.01)

(56) References Cited

U.S. PATENT DOCUMENTS

| | | | |
|---|---|---|---|
| 5,852,493 A * | 12/1998 | Monnin | G01C 15/002 33/291 |
| 6,195,902 B1 * | 3/2001 | Jan | G01C 15/008 33/286 |
| 6,739,062 B2 * | 5/2004 | Jan | G01C 15/12 33/286 |
| 6,871,408 B2 | 3/2005 | Malard et al. | |
| 7,430,808 B2 * | 10/2008 | Chen | B23Q 17/2404 33/263 |
| 7,467,474 B1 * | 12/2008 | Statham | G01B 11/272 33/286 |
| 7,793,423 B2 * | 9/2010 | Loftis | F16L 1/10 33/286 |
| 8,307,562 B2 | 11/2012 | Bascom et al. | |
| 9,127,935 B2 * | 9/2015 | Olexa | G01B 11/14 |
| 2002/0170190 A1 * | 11/2002 | Wetterlind | G01C 15/02 33/286 |
| 2006/0070251 A1 * | 4/2006 | Wu | G01C 15/004 33/286 |
| 2013/0088872 A1 | 4/2013 | Ball | |

* cited by examiner

LASER SCANNING SYSTEMS AND METHODS

RELATED MATTERS

This application claims the benefit of U.S. Prov. App. No. 61/864,158 filed on Aug. 9, 2013, U.S. Prov. App. No. 61/875,360 filed on Sep. 9, 2013, and U.S. Prov. App. No. 61/906,171 filed on Nov. 19, 2013. The content of each of these applications is hereby incorporated by reference in its entirety.

BACKGROUND

There remains a need for improved techniques for three-dimensional scanning.

SUMMARY

A three-dimensional scanner uses a rotatable mounting structure to secure a laser line source in a manner that permits rotation of a projected laser line about an axis of the laser, along with movement of the laser through an arc in order to conveniently position and orient the resulting laser line. Where the laser scanner uses a turntable or the like, a progressive calibration scheme may be employed with a calibration fixture to calibrate a camera, a turntable, and a laser for coordinated use as a three-dimensional scanner. Finally, parameters for a scan may be automatically created to control, e.g., laser intensity and camera exposure based on characteristics of a scan subject such as surface characteristics or color gradient.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "above," "below," and the like, are words of convenience and are not to be construed as limiting terms.

Figure 1:
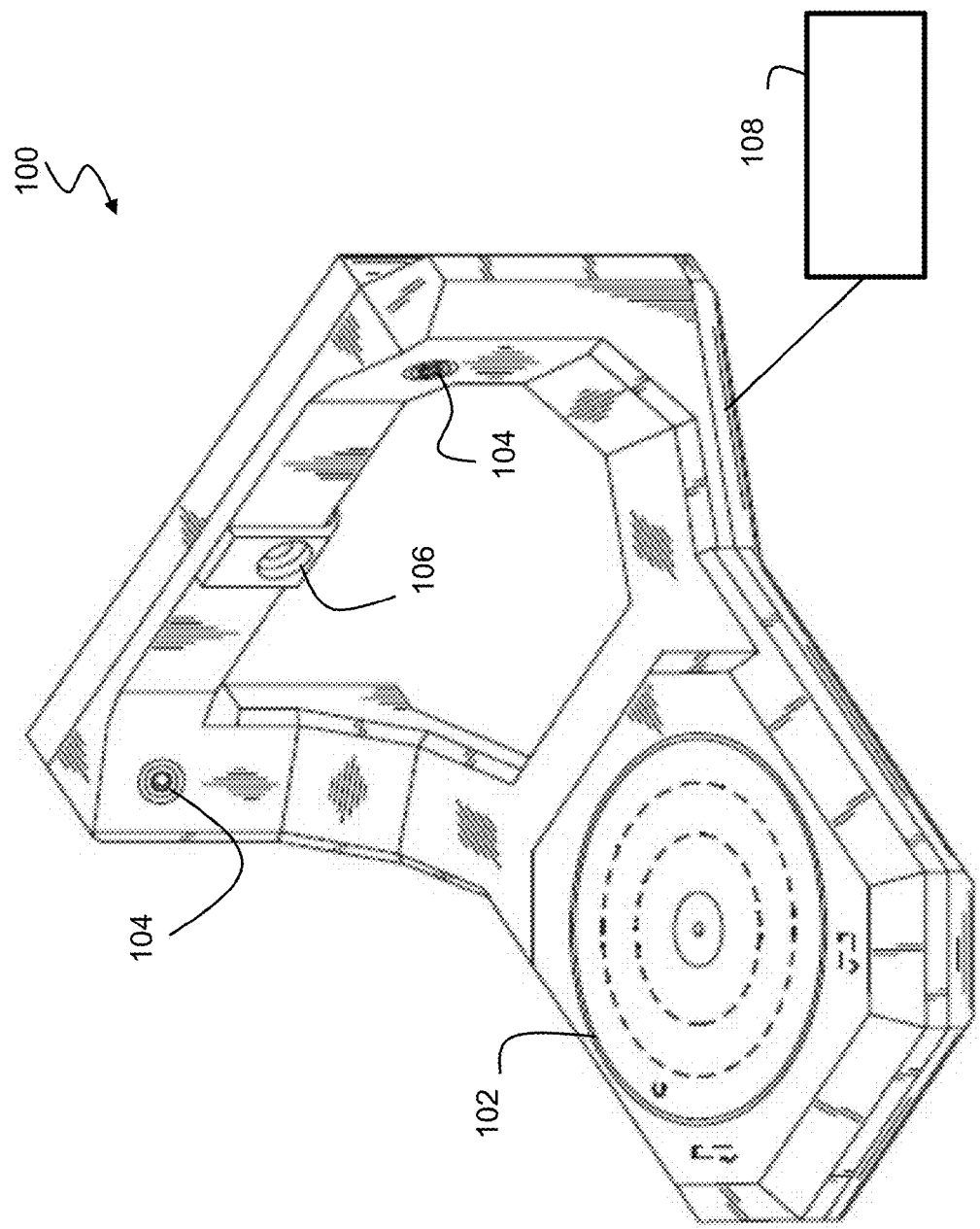
FIG. 1 shows a three-dimensional scanner.

FIG. 1 shows a three-dimensional scanner. The scanner 100 may include a turntable 102, one or more lasers 104, a camera 106, and a controller 108.

The turntable 102 may be any rotating surface such as a rigid plate or the like, which may be rotated to present various surfaces of an object on the turntable to the lasers 104 and the camera 106.

The one or more lasers 104 may be any lasers suitable for projecting lines onto an object that is being scanned on the turntable 102. The lasers 104 can be 3.2 V line lasers or the like with 55 degree fans or any other laser or combination of lasers suitable for a three-dimensional scanning system.

Figure 2:
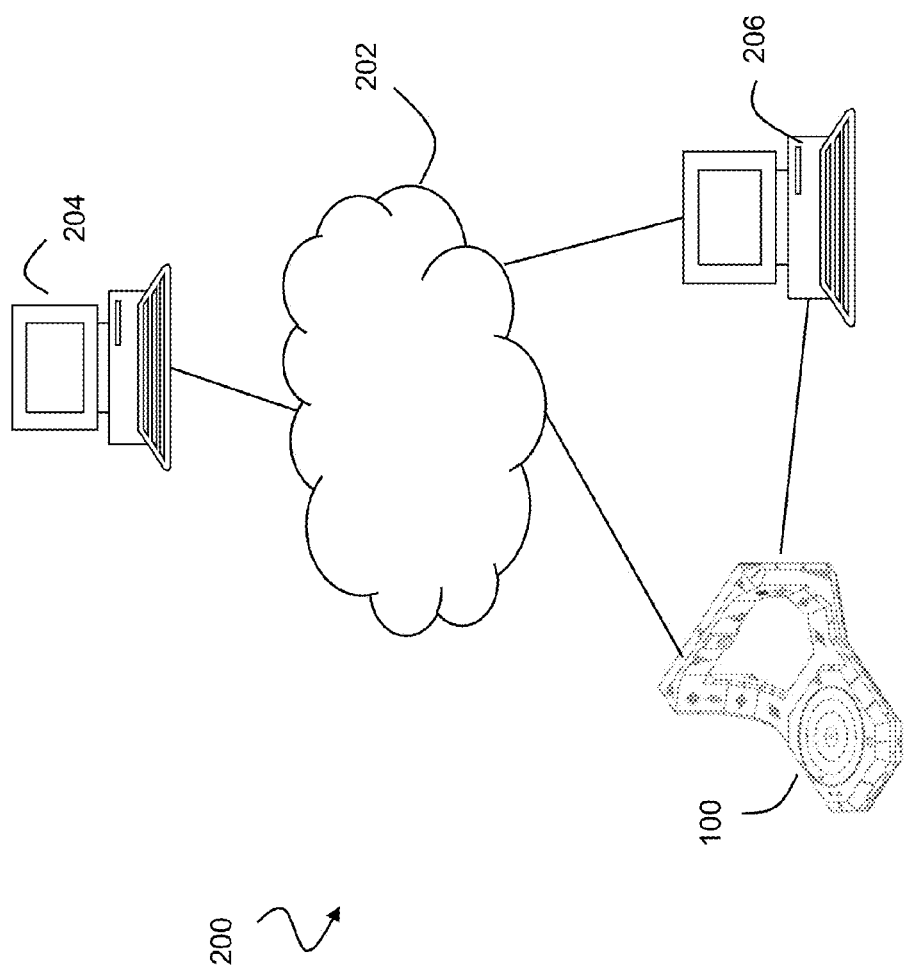
FIG. 2 shows a block diagram of a three-dimensional scanner system.

The camera 106 can be a USB 2.0 Board Camera. While any resolution consistent with desired scan resolution may be used, a 1.3 MP or better color complementary metal-oxide semiconductor (CMOS) image sensor is cheaply commercially available and suitable for many applications. The camera 106 can, for example, operate at 30 frames-per-second with a rolling shutter and a 12 inch focal distance. In another aspect, the camera 106 can operate at 7.5 frames-per-second. In other aspects, the camera can be any camera that can work in a three-dimensional scanning system. The camera 106 can also take video footage and provide a video feed to a user device 206 (as shown in FIG. 2) via a user interface. The scanner 100 can also include a red band-pass filter for the camera 106, which may be fixed or removable/replaceable. The filter may for example be a 25 mm or 27 mm removable and/or retractable 650 nmCW band pass filter with 40 nm pass band. The band-pass filter can remain on the camera 106 during scans for optimal scans. In another aspect, the band-pass filter can be removed for a scan.

In general operation, an item can be placed on the turntable 102. As the item rotates on the turntable 102, the lasers 104 can create laser lines that reflect off the object. The camera 106 can take rapid photographs of the laser lines and a point cloud can be generated via the controller 108 connected to the scanner 100. The controller 108 can be electrically or otherwise coupled in a communicating relationship with the turntable 102, the lasers 104 and the camera 106. In general the controller 108 is operable to control the components of the scanner 100. The controller 108 may include any combination of software and/or processing circuitry suitable for controlling the various components of the scanner 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the scanner 100 such as an on-board processor. In another aspect, this may be a processor associated with a personal computer or other computing device (e.g., a user device 206 as shown in FIG. 2) coupled to the scanner 100, e.g., through a wired or wireless connection. Similarly, various functions described herein may be allocated between an on-board processor for the scanner 100 and a separate computer. All such computing devices and environments are intended to fall within the meaning of the term "controller" or "processor" as used herein, unless a different meaning is explicitly provided or otherwise clear from the context.

FIG. 2 shows a three-dimensional scanner system 200. As shown in FIG. 2, the scanner 100 can be coupled to a user device 206 via a USB cable or any other connector used for locally connecting electronic devices to each other.

The scanner 100 can alternatively or additionally be coupled to the user device 206 through a data network 202. The data network 202 may be any network(s) or internetwork(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants The scanner 100 can include a network interface for connecting to the data network 202. The network interface may comprise, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network.

The user device 206 may be a computing device such as a laptop computer, desktop computer, tablet, smart phone, or other computing device that can be operated by a user to provide a user input to control the scanner 100. In another aspect, the scanner 100 may be configured with a display, user input devices, and the like so that the scanner 100 acts as the user device 206. The user input devices may include a display, buttons, or other physical user interface element(s) on the scanner 100 that a user can interact with.

Upon user input via the user device 206 and/or the scanner 100, the scanner 100 can begin analyzing the object that is placed on the turntable 102 via the controller 108. Once the controller 108 creates a point cloud, the user device 206 can convert the point cloud into a viewable mesh that can be saved as a Thing file, STL, or other supported 3D mesh formats. During each scan, the object can revolve on the turntable twice. The first right laser 104 can create a laser line that reflects off of the object during the first revolution and the second left laser 104 can create a laser line that reflects off of the object during the second revolution. In another aspect, the left laser 104 can create a laser line that reflects off of the object during the first revolution and the right laser 104 can create a laser line that reflects off of the object during the second revolution. In another aspect only one of the lasers can scan the object during the scan.

After the scan, the information from the camera 106 or the two or more lasers 104 can be combined to create a point cloud. The user device 206 can convert the point cloud into a continuous mesh via any combination of software and/or processing circuitry located on the user device 206.

The three-dimensional scanner system 200 can be used for scanning, calibration and automatically sending the scan data to a social networking platform hosted, e.g., on a server 204, which may be a general social networking platform or a special purpose platform dedicated to, e.g., three-dimensional printing, three-dimensional modeling, computer automated design, or the like.

The server 204 may include data storage, a network interface and a processor and/or or processing circuitry. In general, the server 204 may be configured to perform a variety of processing tasks related to the three-dimensional scanning of objects. For example, the server 204 may manage scan jobs received from one or more of the user devices 206, and provide related supporting functions such as content search and management. The server 204 may also include a web server that provides web-based access by the user device 206 to the capabilities of the server 204. The server 204 may also communicate periodically with the scanner 100 in order to obtain status information concerning, e.g., the status of particular scan jobs, any of which may be subsequently presented to a user through the web server or any other suitable interface. Upon user input via the user interface on the user device 206, scanning can begin. The user input can first include clicking a physical or digital button to automatically back up the scans to the server 204 via the data network 202. The processor on the user device 206 or the scanner 100 can prompt this user input either before the first scan of the scanner 100 and/or before or after every scan.

User input can be entered via the user interface on the user device 206 to initiate the scan. The user interface can prompt the user to place an object on the turntable 102 in the correct position. For example, the user interface can prompt the user to place the object on the center of the turntable 102. In another aspect the user interface can prompt the user to place the object on a positioning stand (not pictured). More generally, the user interface may provide step-by-step menus or other interactive elements to guide a user through a scanning procedure. A positioning stand can be used to secure objects that are not stable without support. The stand can also be used to elevate small objects or to secure an object in a specific orientation. The positioning stand can comprise a platform, a rod and one or more arms. A video feed can be shown via the user interface on the client device 206 to assist a user in a placement of an object.

Once an object is placed, the user interface can prompt the user to start the scan. During the scan, the user interface can show the time remaining in the scan, a video feed of the object as it is being scanned, and or a point cloud assembly as it is being generated via the controller 108. Once a scan is complete, a user can be given an option of cropping the scanned object model. Other post-scanning features such as smoothing, leveling, labeling (e.g., with three-dimensional text or the like), hole filling, and so forth may also be automatically or semi-automatically performed through the user interface. Once the model is completed, it can be (automatically or otherwise) shared with a social network, sent to a three-dimensional printer coupled to the scanner 100 for printing, and/or exported for saving.

In another aspect, the user interface can allow the user device 206 to take a picture of the object scanned and associate it with the three-dimensional model. For example a "Take a Photo" dialog can open and show a view of what the scanner 100 sees via the camera. A prompt to slide the red band-pass filter away from the camera lens can be shown before the picture is taken.

In general, the scanner 100, the user device 206, or the controller 108 (or any combination of these) may provide processing circuitry to control operation of the scanner systems contemplated herein, such as by performing the various processes and functions described below.

Figure 3:
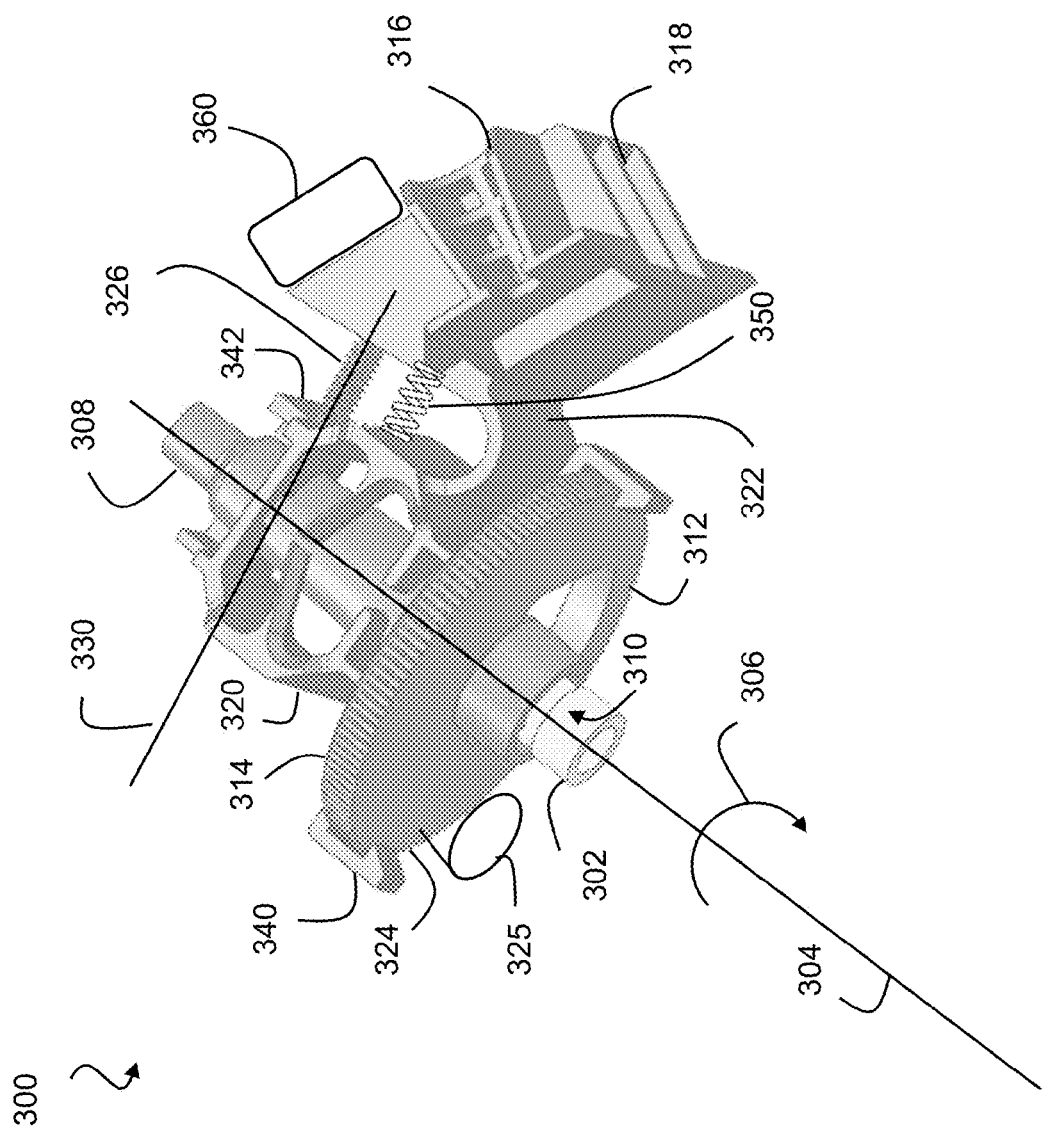
FIG. 3 shows a perspective view of a device for aligning a laser.

FIG. 3 shows a device for aligning a laser. In general, a scanner may have one or more lasers, as noted above, which are preferably aligned to project a line or other pattern in a predetermined manner across a scanning volume. The device 300 may be used to align a laser 302 so that a desired orientation may be obtained.

In general, the laser 302 may be any of the lasers described above, or any other laser that can be configured to project a line or other pattern on a target of a scan. The laser 302 may, for example, be a 3.2 Volt line laser, and/or the laser may have a 55 degree fan over which a laser line is projected. More generally, the pattern may be a line or the like, which may be obtained using an suitable optics, filters or the like to focus and direct light from the laser. The laser 302 may have an axis 304 with an orientation that, when the laser 302 is placed for use in the device 300 (which is in the scanner), directs the laser 302 toward a desired target, or more generally, in a desired direction. Additionally, the laser 302 and a line or other pattern from the laser 302 may have a rotational orientation about the axis 304. By rotating the laser 302 about the axis 304 as indicated by an arrow 306, the rotational orientation of the laser 302 may be controlled.

In general, a laser housing 308 secures the laser 302 in a desired orientation within a mount 316. The laser housing 308 may include a cavity 310 to receive the laser 302. The laser housing 308 may also include a toothed wheel 312 with a plurality of teeth 314 radially spaced about the axis 304 of the laser 302 when the laser 302 is placed for use in the cavity 310.

A mount 316 for the laser housing 308 may include a base 318 configured to be coupled to an external assembly such as a scanner housing. The base 318 may include any suitable slots, tabs, registration features, screw holes, and the like, or any other suitable mechanism(s) for rigidly coupling to the external assembly in a fixed orientation. A holder 320 of the mount 316 may be configured to retain the laser housing 308 in a predetermined orientation while permitting rotation of the laser housing 308 (and the laser 302) about the axis 304 of the laser 302. The laser housing 308 generally retains the laser housing 308 in rotational engagement about the axis 304 of the laser 302. The mount 316 may further include a hinge 322 that hingably couples the base 318 to the holder 320. The laser housing 308 may be configured to snap-fit into the mount 316 where it may be retained by a number of fingers 340, flanges, or the like, or alternatively stated, the mount 316 may be configured to receive the laser housing 308 and retain the laser housing 308 with any of a variety of snap-fit mechanisms.

One end of the laser housing 308 may form an adjustment wheel 324 with the plurality of teeth 314 engaging another surface to secure the laser housing 308 in a desired rotational orientation. The adjustment wheel 324 may be operable as a thumb click wheel or the like, or a supplemental drive wheel 325 may be provided for manual or automated activation. In general, the adjustment wheel 324 is operable to rotate the laser housing 308 around the axis 304 of the laser 302. This rotation may be performed, e.g., by manually rotating the adjustment wheel 324, or by rotating the supplemental adjustment wheel 325 with a motor or other electro-mechanical drive. The adjustment wheel 324 may be ratcheted or otherwise mechanically secured by the plurality of teeth 314 against free rotation after a desired rotational orientation has been established. The adjustment wheel 324 may be a click wheel that moves in discrete units of rotation accompanied by an audible or tactile click. The click wheel may be thumb operable, and may move in fixed increments such as three degree increments, or at any other suitable, regular intervals of rotation. The click wheel may click against a nub, spring, or the like on the mount 316.

An adjustment rod 326 may also be provided that couples the base 318 to the holder 320 at a position away from the hinge 322. In this configuration, the adjustment rod 326 may be operable to displace the base 318 relative to the holder 320 along a second axis 330 of the adjustment rod. In this manner, the hinge 322 is rotated (or hinged) thus moving the axis 304 of the laser relative to the base 318. Thus when the base 318 is fixed to an external support, the adjustment rod 326 can be used to steer the axis 304 through an arc by flexing the hinge 322. In one aspect, the adjustment rod 326 may be a threaded rod that is threaded through a threaded insert 342 that is coupled to a fixed location such as a location in the base 318 or in the holder 320. By rotating the threaded rod, the threaded insert 342 may travel along the threaded rod, thus moving the holder 320 relative to the base 318 and flexing the hinge 322 to reorient the laser 302.

The laser housing 308 and the mount 316 may be formed of any suitable materials according to desired weight, strength, durability, and so forth. For example, the laser housing 308 and the mount 316 may be formed of an injection molded plastic and/or a plastic such as a polycarbonate acrylonitrile butadiene styrene or an acetal homopolymer.

The mount 316 may include a spring 350 such as a coil spring or any other suitable compression spring or the like that urges the holder 320 and the base 318 into a predetermined relative orientation. This spring 350 may thus bias the laser 302 toward a predetermined orientation relative to the mount 316 when the laser 302 is placed for use in the cavity 310 of the holder 320. While the spring 350 may be a separate, discrete component, the spring may also or instead be a living plastic spring formed for example by a resilient material of the hinge 322. The living plastic spring (or any other spring 350 as contemplated herein) may generally bias the laser 302 toward any predetermined position or orientation such as toward a predetermined position relative to the mount 316 when the laser 302 is placed for use in the cavity 310.

This configuration advantageously provides convenient positioning and rotation of a line laser within a scan volume with a relatively simple mechanical arrangement and a small number of moving parts. Additional adjustments may be necessary or desirable, and as such a supplemental positioning assembly 360 may be provided in order to provide additional degrees of rotational or translational freedom for adjusting the laser 302. For example, the positioning assembly 360 may facilitate translation of the axis 304 within a plane perpendicular to the axis 304, or alignment of the axis 304 of the laser 302 with one or more additional degrees of freedom, that is, degrees of freedom not provided by the mount 316 and laser housing 308 described above. This may include any suitable fixture, set screws, and so forth, for adjusting position and orientation of the base 318 relative to a fixed physical reference that the base 318 is attached to (such as a scanner housing). A variety of suitable mechanisms are known in the art and may be adapted for use as a positioning assembly 360 as contemplated herein.

Figure 4:
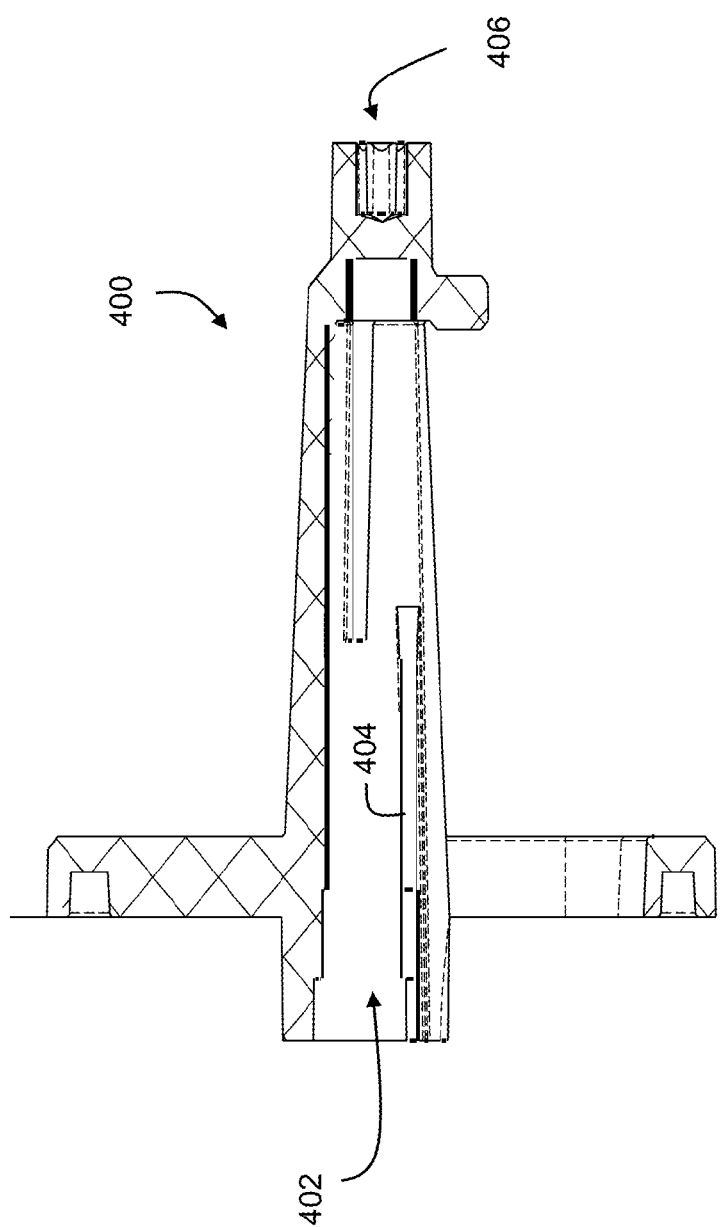
FIG. 4 shows a cross section of a laser housing.

FIG. 4 shows a cross section of a laser housing such as the laser housing described above. The laser housing 400 may generally include a cavity 402 to receive a laser as described above. The laser housing 400 may also include a plurality of engagement elements 404 such as ribs, fins, protrusions or the like within the cavity 402 that secure a laser in a desired position and orientation within the cavity 402. The engagement elements 404 may in general be shaped and sized in any suitable manner to hold a laser when the laser is positioned in the cavity. For example, the engagement elements 404 may include ribs as illustrated, which may secure the laser with a press-fit or interference fit to frictionally engage the laser in the desired position. A second cavity 406 may be included that is formed to receive a drive head such as a screw driver, hex wrench or the like. The second cavity 406 may be positioned within the mount 316 of FIG. 3 such that the second cavity 406 is accessible externally with a screw driver or the like to adjust the rotational orientation of the laser. Similarly, a portion of the adjustment wheel 324 may be exposed outside a scanner housing to facilitate convenient manual adjustment.

Figure 5:
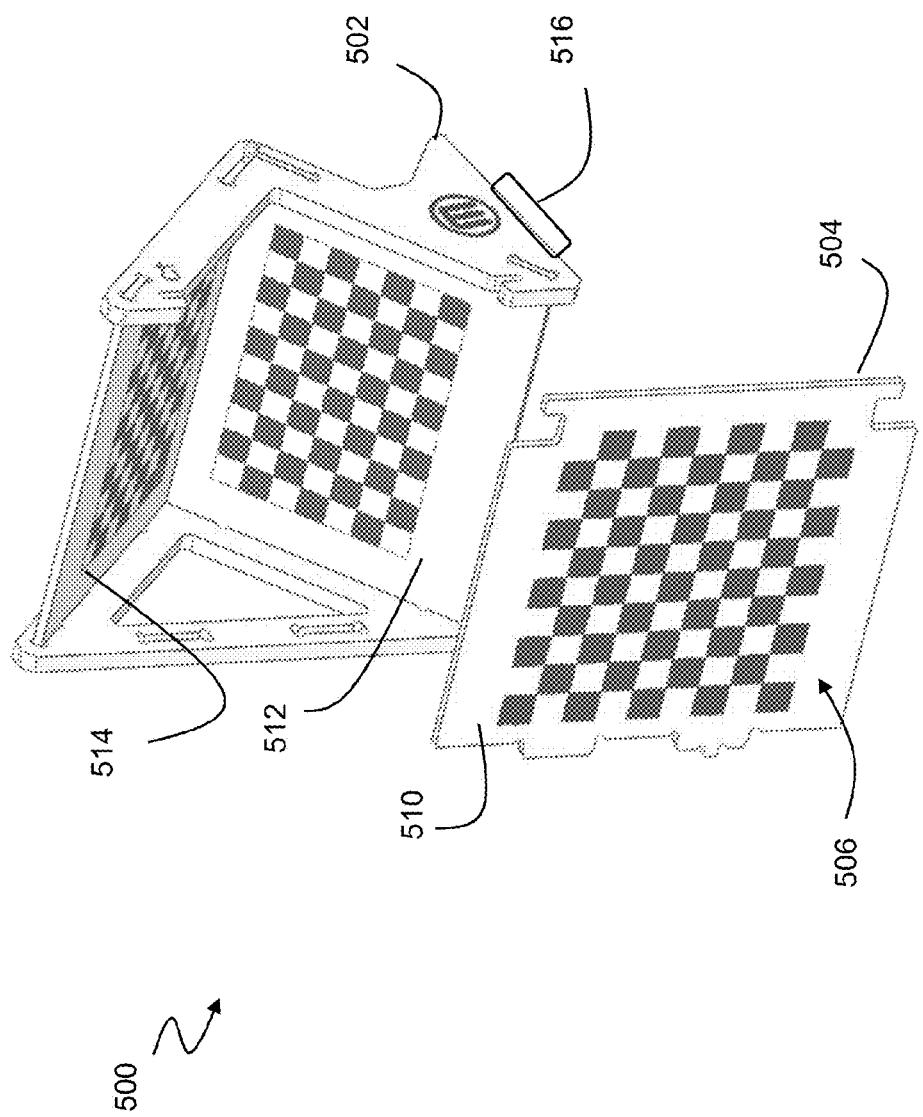
FIG. 5 shows a calibration component.

FIG. 5 shows a calibration component. In general, a scanner such as any of the scanners described herein may be calibrated prior to use in order to obtain more accurate scan results. In general, this involves placing a calibration component such as the calibration component 500 shown in FIG. 5 onto the turntable of a scanner and capturing images in a variety of poses and under a variety of lighting conditions.

In one aspect, the calibration component 500 may be a multi-part component that can be configured to present a variety of different surfaces, patterns and the like. For example, as illustrated, the calibration component 500 may have a base 502 with angled surfaces and a checkerboard pattern or the like, as well as a removable plate 504 that can be removed from and replaced to the base 502 to provide a horizontal surface for calibration-related data acquisition. While a checkerboard is shown as the calibration pattern 506, it will be understood that a variety of calibration patterns may also or instead be employed including, without limitation a dot grid, a line grid, a random pattern, and so forth. The calibration pattern 506 may also or instead include a predetermined three-dimensional shape of the calibration component 500, such as the angled surfaces of the base 502.

In one aspect, the calibration component 500 may include a plurality of surfaces. This may include at least three panels 510, 512, 514 each including the calibration pattern 506 (i.e., the same pattern) or different calibration patterns, or some combination of these. The calibration component 500 may also include two different faces such as a first face formed by one of the panels 510, and a second face formed by the other panels 512, 514. As noted above, one of the panels 510 may be removable and the face of the first panel 510 may occlude the calibration pattern on the other panels 512, 514 when attached to the base 502. This permits a single calibration fixture to provide various different patterns and three-dimensional shapes to facilitate various calibration steps as discussed below.

The calibration component 500 may include a tab 516 or other protrusion or the like configured to couple the calibration component 500, or the base 502 of the calibration component 500, to a turntable or other base for a scanning system in order to retain the calibration component 500 in a predetermined position and orientation during calibration. Any other number of tabs may be provided to secure the calibration component 500, or the base 502 or one of the panels 510, 512, 514 in a desired orientation for use in calibrating a scanner.

Figure 6:
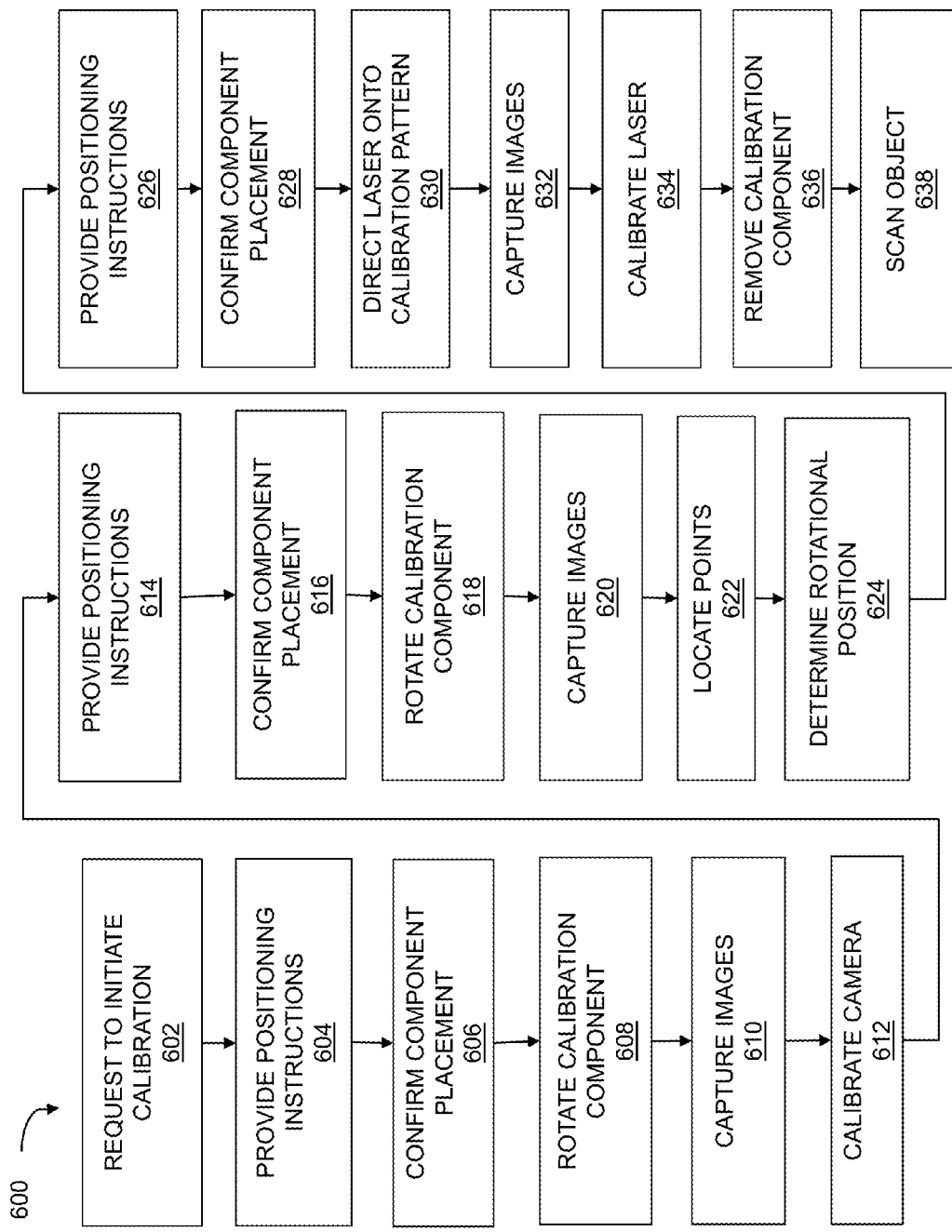
FIG. 6 shows a method for calibrating a three-dimensional scanner.

FIG. 6 shows a method for calibrating a three-dimensional scanner. In general a multi-configuration calibration component may provide a variety of configurable and positionable surfaces that can be used in different calibration steps. With this calibration component, a progressive calibration of a camera, a turntable, and a laser may be performed. Configuration and positioning of the calibration component may be orchestrated by a user interface that interactively guides a user through various positioning and configuration steps.

As shown in step 602, the method 600 may begin with receiving user input including a request to initiate calibration of a three-dimensional scanner. The three-dimensional scanner may include a turntable, a laser, and a camera as generally described above. The request may be received, for example, from a user through a user interface, which may be a user interface rendered on the scanner or any suitable device coupled to the scanner such as a local desktop or laptop computer.

As shown in step 604, the method 600 may include providing information to the user for positioning a calibration component on the turntable in a first position for camera calibration. The calibration component may be any of the calibration components described herein, and may for example include a plurality of surfaces with at least two of the plurality of surfaces include calibration patterns. The information may be provided, for example, by displaying instructions to the user in the user interface. The instructions may specify a configuration of the calibration component, particularly where the component has removable surfaces or other multiple configurations, and may more specifically identify slots, tabs or the like on the turntable where the calibration component should be placed.

As shown in step 606, the method 600 may include receiving an indication that the calibration component is properly positioned on the turntable for camera calibration. This confirmation may be received, for example by a user pressing a button on the scanner or operating a control in the user interface (after suitably placing the component). Placement may also or instead be confirmed automatically or semi-automatically by capturing and analyzing images from the uncalibrated camera(s). Thus receiving the indication that the calibration component is properly positioned or configured may in general include receiving a manual user input, receiving a computer generated input such as an input from a computer vision system, or some combination of these.

As shown in step 608, the method 600 may include rotating the turntable about a rotation axis thereby rotating the calibration component.

As shown in step 610, the method 600 may include capturing images of the calibration component on the turntable with the camera as the turntable is rotating, thereby providing a first plurality of images. This may include capturing video images, or capturing still images at a predetermined rate, e.g., at particular time intervals or at particular rotational intervals of the turntable.

As shown in step 612, the method 600 may include performing a first calibration calculation with the first plurality of images to calibrate the camera, thereby providing a calibrated camera. Camera calibration is a necessary step in three-dimensional processing to facilitate extraction of three-dimensional data from two-dimensional images. A variety of suitable techniques are known and well characterized in the art, and these techniques are not repeated here except to note generally that known features and/or displacements can be used to recover three-dimensional characteristics or parameters of a camera system in a manner that permits subsequent three-dimensional measurements with improved accuracy.

As shown in step 614, the method 600 may include providing information to the user for positioning the calibration component on the turntable for turntable calibration. This may also or instead include providing information to reconfigure the calibration component, e.g., by adding or removing a panel, or by changing a position or orientation of a panel or other element of the calibration component. The information may be provided, for example, by displaying instructions to the user in the user interface. The instructions may specify a configuration of the calibration component, particularly where the component has removable surfaces or other multiple configurations, and may more specifically identify slots, tabs or the like on the turntable where the calibration component should be placed.

As shown in step 616, the method 600 may include receiving an indication that the calibration component is properly positioned for turntable calibration. This confirmation may be received, for example by a user pressing a button on the scanner or operating a control in the user interface. Placement may additionally be confirmed automatically or semi-automatically by capturing and analyzing images from the camera(s). Thus receiving the indication that the calibration component is properly positioned or configured may in general include receiving a manual user input, receiving a computer generated input such as an input from a computer vision system, or some combination of these.

As shown in step 618, once the calibration component is properly positioned for turntable calibration, the method 600 may include rotating the turntable about the rotation axis thereby rotating the calibration component.

As shown in step 620, the method 600 may include capturing a second plurality of images of the calibration pattern included on at least one of the plurality of surfaces of the calibration component using the calibrated camera. This may include capturing video images, or capturing still images at a predetermined rate, e.g., at particular time intervals or at particular rotational intervals of the turntable.

As shown in step 622, the method 600 may include determining locations of predetermined points on the calibration pattern using the captured images. This may be, e.g., corners of the calibration pattern on the calibration component, or other interstitial locations within the checkerboard pattern or the like. In one aspect, determining locations may include using computer vision to determine the corners of the checkerboard or any other suitable feature or location within a calibration pattern.

As shown in step 624, the method 600 may include determining a rotational position of the rotation axis of the turntable with respect to the camera based upon the locations of the predetermined points, thereby providing a calibrated turntable. In this manner the turntable may be calibrated so that it can produce accurate, controllable rotational orientations. As noted above, a variety of calibration techniques are known in the art that may be suitably adapted for use in providing a calibrated turntable as contemplated herein. By way of example and not of limitation, determining the rotational position of the rotation axis of the turntable with respect to the camera may include computing centers for circles created by rotation of the predetermined points of the calibration pattern about the rotation axis and averaging the centers to determine an average center representing the rotational position of the rotation axis.

As shown in step 626, the method 600 may include providing information to the user for positioning the calibration component on the turntable in a third position (and/or configuration) for laser calibration. The third position may include the calibration component oriented such that the calibration patterns of the at least two of the plurality of surfaces are non-planar with respect to each other and are disposed in a field of view of the calibrated camera. For example, by removing a horizontal panel to expose to non-planar panels such as those described above with reference to FIG. 5, a suitable calibration surface may be presented. Thus in one aspect, the calibration component may include a removable panel that is removed to configure the calibration component for laser calibration.

As shown in step 628, the method 600 may include receiving an indication from the user that the calibration component is properly positioned for laser calibration. This confirmation may be received, for example by a user pressing a button on the scanner or operating a control in the user interface. Placement may additionally be confirmed automatically or semi-automatically by capturing and analyzing images from the camera(s). Thus receiving the indication that the calibration component is properly positioned or configured may in general include receiving a manual user input, receiving a computer generated input such as an input from a computer vision system, or some combination of these.

As shown in step 630, the method 600 may include directing a beam of the laser on the calibration patterns of the calibration component in the field of view of the calibrated camera.

As shown in step 632, the method 600 may include capturing a third plurality of images of the beam on the calibration patterns of the calibration component.

As shown in step 634, the method 600 may include performing a calibration calculation for the laser based on the third plurality of images, thereby providing a calibrated laser. This may generally include any suitable calibration calculations for improving accuracy of the laser in terms of, e.g., focus, position, intensity, or any other controllable aspect of the laser.

As shown in step 636, the method 600 may include removing the calibration component from the turntable so that a scanning volume is available for a scan target.

As shown in step 638, the method 600 may include capturing a scan of an object with the calibrated camera, the calibrated turntable, and the calibrated laser.

Figure 7:
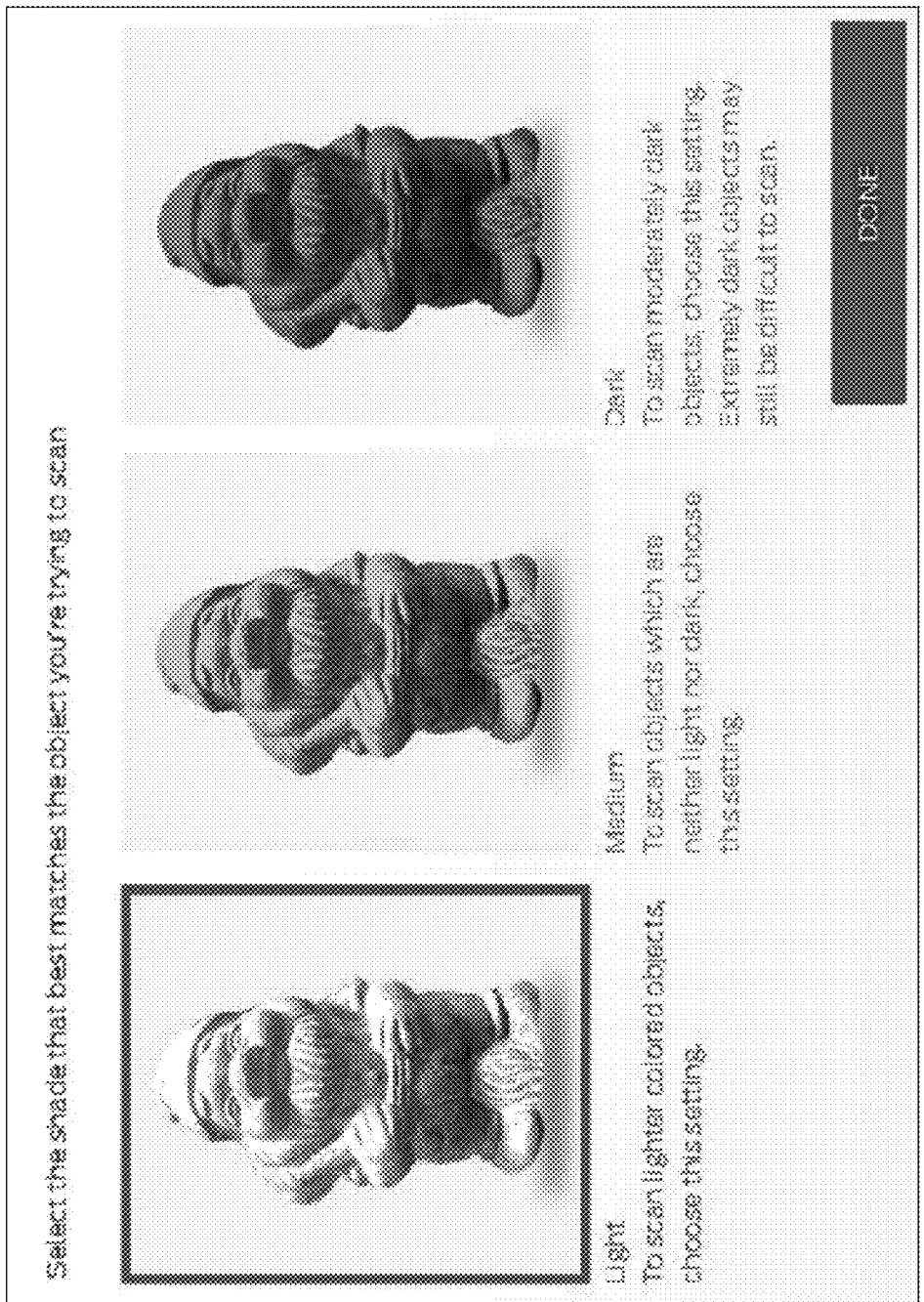
FIG. 7 shows a user interface for automatically selecting three-dimensional scan parameters.

FIG. 7 shows a user interface 700 for automatically selecting three-dimensional scan parameters. When operating a three-dimensional scanner such as a scanner with a turntable, laser, and camera as described herein, the optical properties of a scan target can significantly influence scan results. However, a user may not be able to readily balance, e.g., laser output parameters and camera exposure parameters to achieve the best results. To assist a user in selecting the best parameters, a semi-automated process may be provided that permits a user to specify various optical properties such as shade, color and surface texture. The scanner (or other processing circuitry associated with the scanner, such as a locally coupled computer) may then automatically select specific operating parameters for the scanner components based on the user-provided description of an object's optical properties. While the user interface 700 of FIG. 7 specifically depicts a user selection of one of three possible shades (light, medium, dark), it will be understood that any other user-perceptible optical characteristics may also or instead be used including without limitation surface texture, opacity, transparency, glossiness, and so forth.

Figure 8:
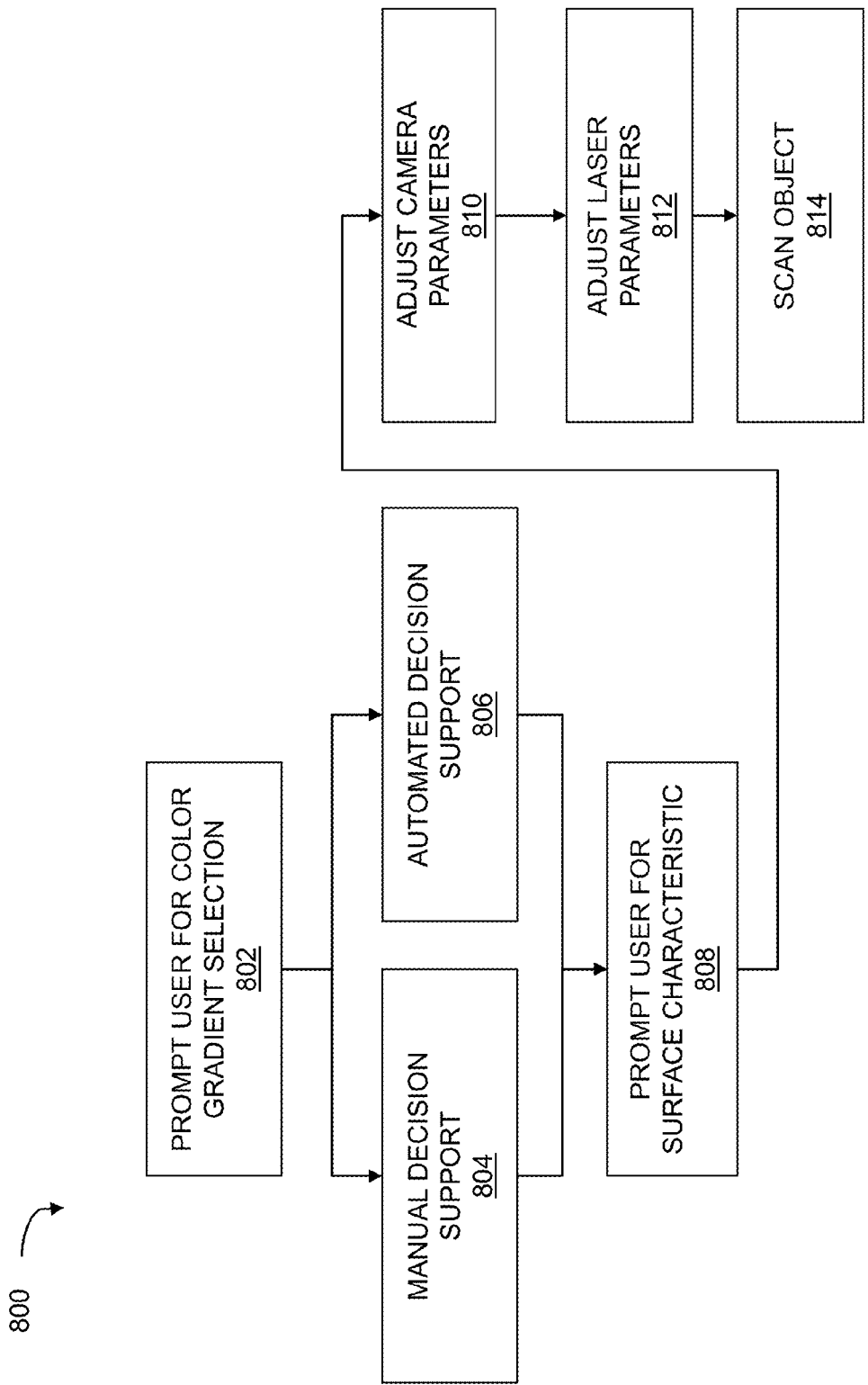
FIG. 8 shows a method for automatically selecting three-dimensional scan parameters.

FIG. 8 shows a method for automatically selecting three-dimensional scan parameters. In general, the method 800 may include receiving user selections of various optical properties, and then adjusting specific system parameters according to the user-provided information.

As shown in step 802, the method 800 may begin with providing a first prompt in a user interface configured to receive a user input selecting a color gradient that best matches an object to be scanned by the three-dimensional scanner. The color gradient may, for example, include a shade selected from a group consisting of light, medium, and dark, or any other suitable categories at any desired level of granularity or detail.

As shown in step 804, the method 800 may include providing manual decision support to a user in the user interface. For example, a decision may be assisted with any of a variety of visual aids for the user. For example, with a color gradient of two or more shades, this step may include displaying examples of each of the two or more shades to assist the user in selecting the color gradient at the first prompt. This step may further include displaying a video feed of the object to be scanned for a direct, on-screen comparison of the object to the examples within the user interface.

As shown in step 806, the method 800 may also or instead include providing automated decision support to a user. For example, this may include capturing an image of the object that is to be scanned, and performing a comparison of the image to a number of images of previously scanned objects using, for example, any of a variety of similarity measures or the like. In a semi-automated mode, the method may include providing relevant information to a user, such as by presenting a selection of a color gradient or surface characteristic that resulted in a successful scan of one or more of the previously scanned objects. Alternatively, the method may proceed fully automatically, e.g., by automatically selecting a color gradient or a surface characteristic for a scan based on the comparison when one of the number of images appears to include closely corresponding optical properties.

As shown in step 808, the method 800 may include providing a second prompt in the user interface configured to receive a user input selecting a surface characteristic that best matches a surface of the object to be scanned, the surface characteristic including at least one of glossiness, fuzziness, and texture.

As shown in step 810, the method 800 may include adjusting camera parameters based on the color gradient and the surface characteristic thereby adjusting an exposure of the camera. For example, this may include adjusting a shutter speed and a lens aperture of the camera to suitable selections best matched to the characteristics of the object. For example, where the color gradient is light, the camera may be responsively adjusted to a lower exposure. Where the color gradient is dark, the camera may be responsively adjusted to a higher exposure. In another aspect, a fixed exposure may be maintained independent of the color gradient, but the exposure may vary in response to other factors such as a color composition or surface texture.

As shown in step 812, the method 800 may include adjusting an intensity of the laser based on the color gradient and the surface characteristic. For example, where the color gradient is light, the laser may be responsively adjusted to a higher intensity. Where the color gradient id dark, the laser may be responsively adjusted to a lower intensity. In another aspect, a fixed laser intensity may be maintained independent of the color gradient, but the laser intensity may vary in response to other factors such as a color composition or surface texture.

As shown in step 814, the method 800 may include scanning an object using the adjusted laser and camera parameters.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device for aligning a laser in a three-dimensional scanning system comprising:
    a laser configured to project a line, the laser having an axis;
    a laser housing including a cavity to receive the laser and a plurality of engagement elements shaped and sized to hold the laser when positioned in the cavity, the laser housing further including a toothed wheel having a plurality of teeth radially spaced about the axis of the laser when the laser is placed for use in the cavity, the toothed wheel forming an adjustment wheel operable to rotate the laser housing about the axis of the laser;
    a mount including a base couplable to an external assembly, a holder to receive the laser housing and to retain the laser housing in rotational engagement about the axis of the laser, a hinge that hingably couples the base to the holder, and a spring that biases the laser toward one or more of a predetermined orientation and a predetermined position relative to the mount when the laser is placed for use in the cavity; and
    an adjustment rod coupling the base of the mount to the holder of the mount, the adjustment rod operable to displace the base relative to the holder along a second axis of the adjustment rod, thereby rotating the hinge and moving the axis of the laser relative to the base.

2. The device of claim 1 wherein the laser includes a 3.2 Volt line laser.

3. The device of claim 1 wherein the laser is a line laser having a 55 degree fan.

4. The device of claim 1 wherein the plurality of engagement elements includes one or more ribs configured to secure the laser with a press-fit.

5. The device of claim 1 wherein the laser housing is configured to snap-fit into the mount.

6. The device of claim 1 wherein the adjustment wheel is a click wheel.

7. The device of claim 6 wherein the click wheel is thumb operable.

8. The device of claim 6 wherein the click wheel moves in three degree increments.

9. The device of claim 6 wherein the click wheel clicks against one or more nubs on the mount.

10. The device of claim 1 wherein the adjustment rod includes a threaded rod engaged with a threaded insert in the base.

11. The device of claim 1 wherein the adjustment rod includes a threaded rod engaged with a threaded insert in the holder.

12. The device of claim 1 wherein the laser housing and the mount are formed of an injection molded plastic.

13. The device of claim 1 wherein the laser housing and the mount are formed of a polycarbonate acrylonitrile butadiene styrene.

14. The device of claim 1 wherein the laser housing and the mount are formed of an acetal homopolymer.

15. The device of claim 1 wherein the mount includes a living plastic spring that biases the laser toward the predetermined orientation.

16. The device of claim 1 wherein the mount includes a living plastic spring that biases the laser toward the predetermined position.

17. The device of claim 1 further comprising a positioning assembly for translation of the axis of the laser within a plane perpendicular to the axis of the laser.

18. The device of claim 1 further comprising a positioning assembly for controlling an alignment of the axis of the laser with one or more additional degrees of freedom.

\* \* \* \* \*